INVENTORS.
Donald W. Blair,
Paul B. Powell.
BY
ATTORNEY.

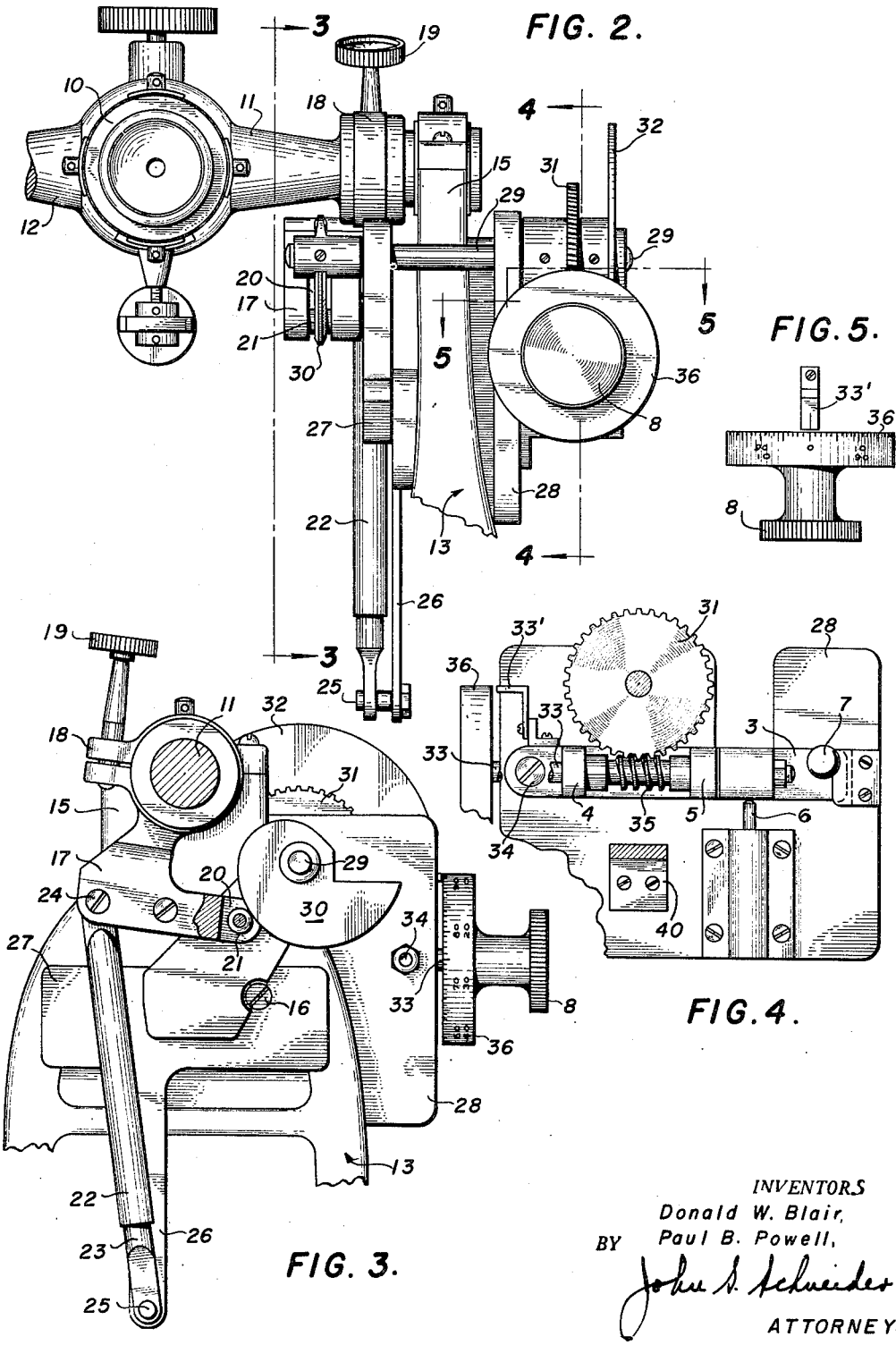

Sept. 3, 1957  P. B. POWELL ET AL  2,804,689
SURVEYING INSTRUMENT
Filed Dec. 22, 1955  3 Sheets-Sheet 3

INVENTORS.
Donald W. Blair,
Paul B. Powell,
BY
John S. Schneider
ATTORNEY.

United States Patent Office 2,804,689
Patented Sept. 3, 1957

2,804,689

SURVEYING INSTRUMENT

Paul B. Powell and Donald W. Blair, Houston, Tex., assignors, by mesne assignments, to Esso Research and Engineering Company, Elizabeth, N. J., a corporation of Delaware Application December 22, 1955, Serial No. 554,722

4 Claims. (Cl. 33—71)

This invention is directed to improvements in surveying instruments, transit theodolites and the like, wherein the observations made by the instruments may be obtained by direct arithmetic calculations. More particularly, the invention is directed to an instrument for determining vertical and horizontal distances employing a telescope and having a cam and dial indicating means attached thereto wherein the dial indicating means provides readings which when multiplied by the distance between the stadia wires on the stadia rod will give the horizontal distance from, and elevation of, the object sighted.

Normally in stadia rod surveying operations a telescope, provided with two horizontal cross-hairs or stadia wires, is employed in determining the height and distance away of an object on which the stadia rod is positioned and on which the telescope is sighted.

When the axis of the telescope is horizontal the stadia rod is cut horizontally and the distance from the telescope to the stadia rod is obtained by multiplying the difference in reading of the upper and lower stadia wires by a magnification factor characteristic of each telescope. However, when the axis of the telescope is not horizontal the reading is greater than that for the real distance between the instrument and the stadia rod because of the obliquity of the latter with respect to the axis of the telescope. The product of this reading by the magnification factor of the telescope yields an apparent distance which must be subjected to trigonometrical operations before the correct distance can be obtained. Also it is necessary to resort to trigonometrical operations to obtain the height of the object. This well known method of transit operation is discussed in detail in Elementary Surveying, by Breed and Hosmer, vol. 1, 8th ed., pages 211–222.

An important object of this invention is to eliminate the trigonometrical operations necessary in ordinary transit work by providing means on the telescope whereby the height and distance may be directly measured, the scale indicator readings requiring only multiplication by the distance between the stadia wires to obtain directly the vertical and horizontal distances.

Briefly, this invention comprises a telescope barrel pivotally mounted for vertical movement, a cam follower affixed to the barrel and rotatable therewith, a horizontally extending shaft having a cam positioned thereon, biasing means adapted to urge said cam follower in contact with said cam, a dial indicator secured to said shaft and rotatable therewith adapted to indicate the horizontal and vertical distances and releasable means engagedly connecting with said shaft adapted to rotate said cam.

Referring to the drawings:

Fig. 2 is a fragmentary end view taken along lines 2—2 of Fig. 1.

Fig. 3 is an elevation, partly in section, taken along lines 3—3 of Fig. 2.

Fig. 4 is an elevation, partly in section, taken along lines 4—4 of Fig. 2.

Fig. 5 is a plan view taken along lines 5—5 of Fig. 2.

Figure 1:
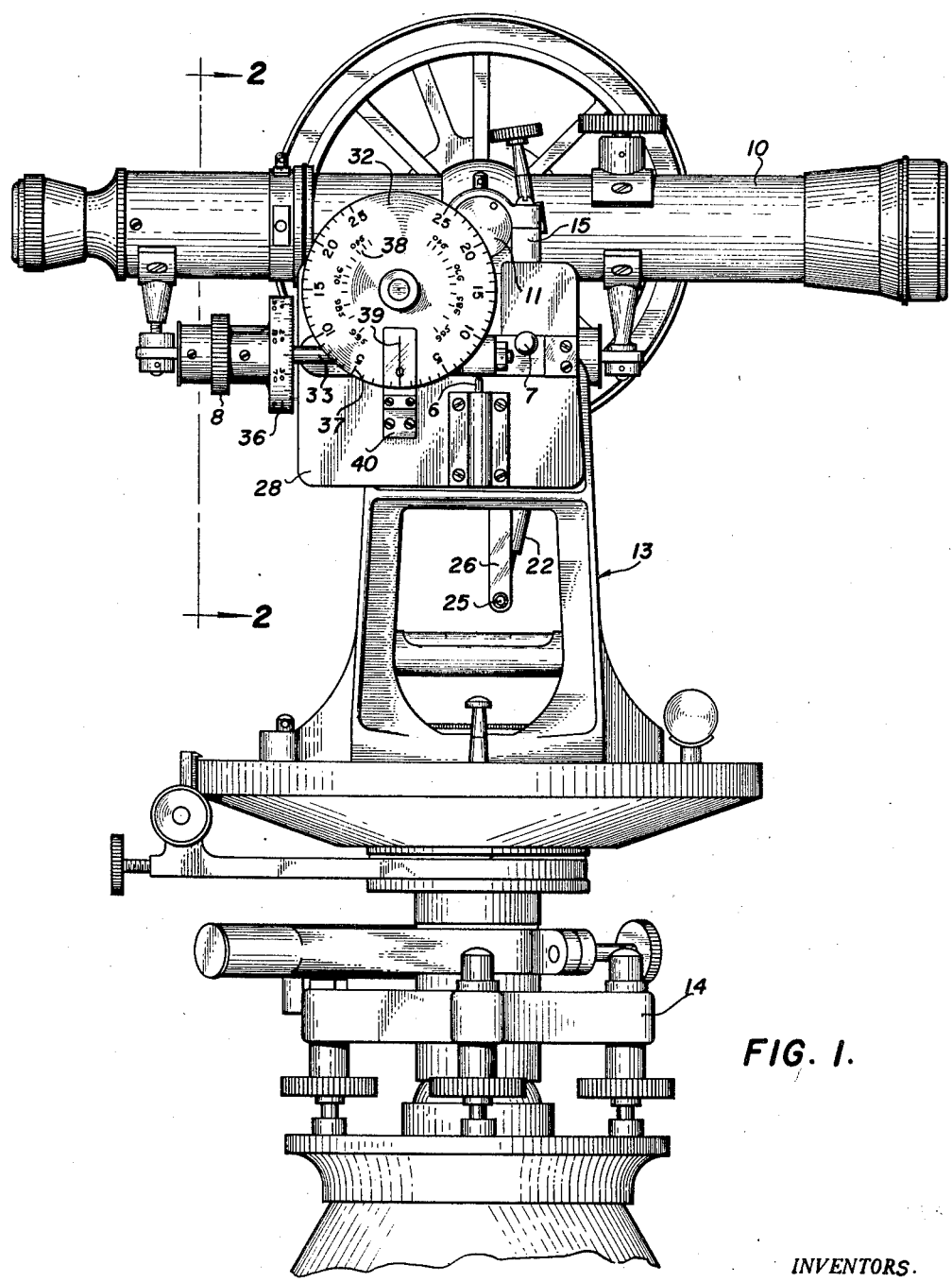
Fig. 1 is a side view of the improved surveying instrument.

Referring more particularly to the drawings wherein identical numerals designate identical parts, Fig. 1 illustrates a conventional transit including a telescope barrel 10, provided with laterally extending barrel shafts 11 and 12 (Fig. 2) pivotally supported on a bifurcated frame 13 which is rotatably mounted on a base member 14. The outer ends of shafts 11 and 12 are journaled in bearings arranged on the upper ends of the two parallelly extending legs 15 of frame 13, only one of which is shown in the figures.

As shown more clearly in Figs. 2 and 3, a cam follower assembly 17 is secured to laterally extending shaft 11 of the telescope barrel 10 by means of a clamp 18. A clamp screw head 19 is provided for clamp 18 to adjustably secure the cam follower to shaft 11. The cam follower assembly 17 is provided with a forked portion 20 in which is mounted a roller member 21. A sleeve 22 is pivotally connected to the cam follower assembly as at 24 and slidably mounts a cylindrical member 23 which is pivotally connected as at 25 to a vertical extension 26 of an inner plate member 27. The plate member 27 is secured to leg 15 and to an outer plate member 28 by means of screw 16. A biasing means, such as a tension spring, not shown, is positioned in sleeve 22 to normally bias the pivot end 24 of cam follower assembly 17 downwardly. A shaft 29 is rotatably supported by inner and outer plates 27 and 28, respectively. A cam 30 is affixed to the inner end of shaft 29 and is rotatable therewith. The other outer end of shaft 29 has mounted thereon, for rotation therewith, a wheel gear 31 and a main dial indicator 32. As more clearly seen in Fig. 4, an arm 3, having bearing members 4 and 5 mounted thereon, is positioned transverse to shaft 29 and pivotally secured to plate 28 as at 34. A rotatable shaft 33 is journaled in bearings 4 and 5 and provided with a worm gear 35 which engagedly connects with wheel gear 31. A micrometer dial 36 is mounted on one end of shaft 33 for rotation therewith and a micrometer index 33' is affixed to arm 3 adjacent dial 36. A disengaging knob 7 is secured to the movable end of arm 3. Gear 35 is biased upwardly into engagement with worm wheel 31 by a spring-biased plunger 6 supported on plate 28 and engaging with arm 3, as shown. Also affixed to shaft 33 adjacent dial 36 is a knurled handle or knob 8, adapted to rotate shaft 33.

In operation, the telescope barrel 10 is leveled, the conventional azimuth scale is zeroed and the micrometer dial 36 is zeroed. Then, in making an observation, the micrometer dial 36 is rotated by means of handle or knob 8, thereby rotating shaft 33, which in turn rotates worm 35. Rotation of worm 35 rotates the engaged worm wheel 31 which in turn rotates horizontally extending shaft 29, thereby causing rotation of indicator dial 32 and cam 30. Rotation of cam 30 moves cam follower 17 which is spring-biased against the cam surface by spring-loaded biasing means 22, 23. As the cam follower 17 is securely affixed to the lateral extension shaft 11, the telescope tilts upwardly or downwardly with the movement of the cam follower.

The main dial indicator 32 is provided with a linear scale 37 and a non-linear scale 38 (Fig. 1). An index 39 is secured to plate 28 by means of an index support 40. The linear scale 37 is adapted to indicate elevations to be measured and the non-linear scale 38 is adapted to indicate the horizontal distances to be measured.

To speed up operations, worm 35 may be disengaged from worm wheel 31 by pressing down on disengaging or releasing knob 7, thereby pivoting arm 3 downwardly against the bias of plunger 6. By this arrangement the telescope may be tilted up or down to approximately the desired position by hand and the worm wheel 31 and worm 35 then re-engaged by releasing force on knob 7 to obtain the same results as when the micrometer dial 36 is rotated to tilt the telescope.

The design of the cam and related elements is such that for any angle $\theta$ of tilt of the telescope barrel 10 the main linear scale 37 indicated the height quantity $M \cos \theta \sin \theta$ at the index 39. M is the magnification or multiplication constant of the instrument and for most instruments M is 100. Thus for a 15° angle the dial will read 100 sin 15° cos 15°=25. This number when multiplied by the length of the stadia rod intercepted by the two stadia hairs of the instrument will give the elevation of the rod with respect to the instrument. A vernier (0–100) for the main dial linear scale 37 appears on the micrometer dial 36. Similarly, the non-linear scale 38 will read 100 cos² 15°=93.3, which when multiplied by the stadia reading, gives the horizontal distance of the rod from the instrument.

Figure 6:
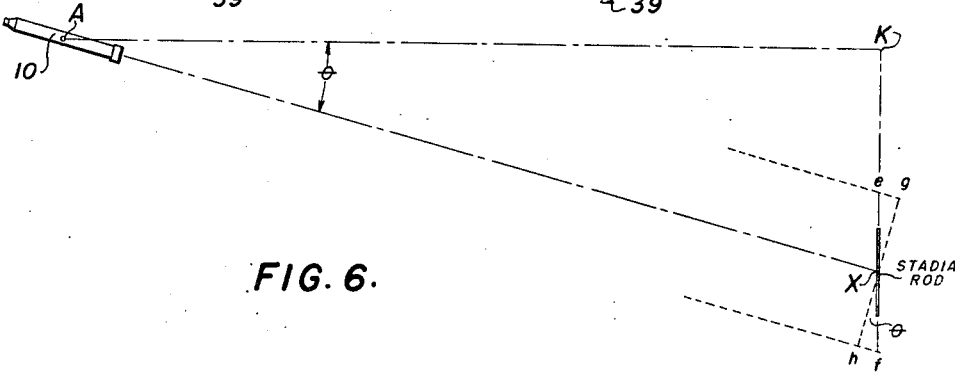
Fig. 6 is a diagrammatic showing of the operation of the instrument.

Fig. 6 illustrates the manner of operation of the instrument. The following computations are employed for determining the horizontal and vertical distances AK and KX, respectively, of a stadia rod X from a telescope A and wherein $M$=the magnification constant of the instrument
$\overline{ef}$=the stadia rod reading
$\overline{gh}$=the corrected stadia rod reading and
$\theta$=the angle of tilt of the telescope thus, (1) $\qquad \overline{gh} = \overline{ef} \cos \theta$ and for the elevation, (2) $\qquad KX = AX \sin \theta$ hence, (3) $\quad KX = M\overline{gh} \sin \theta = M\overline{ef} \cos \theta \sin \theta = M\overline{ef} \tfrac{1}{2} \sin 2\theta$ Assuming for purposes of illustration that the telescope is tilted at an angle of 15° and that the stadia rod reading $ef$ is 10 and the magnification constant M is 100, and substituting these values in Equation 3, then $KX=100\times10\times\frac{1}{2}\sin 30°=250$ ft. vertical elevation. For the horizontal distance, (4) $\qquad AK = AX \cos \theta = M\overline{gh} \cos \theta = M\overline{ef} \cos^2 \theta$ Substituting the above assumed values in Equation 4 then $AK=100\times10\times\cos^2 15°=933$ ft.

On the instrument, the main dial linear scale 37, in this operation, will read 25 at the index 39 (Fig. 1) indicating that the micrometer drum 36 has revolved 25 revolutions so that 25×10=250 ft. vertical elevation. The main dial non-linear scale will read 93.3 at index 39 so that 93.3×10=933 ft., the horizontal distance.

Figs. 7–10 illustrate in detail the manner in which the equation of the cam may be derived.

Figure 7:
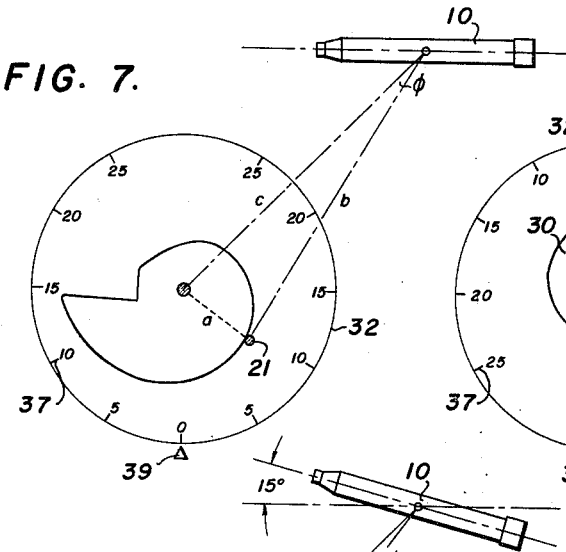
Figs. 7, 8, 9 and 10 are schematic illustrations of the relative positions of the cam dial and associated telescope barrel.
Figure 8:
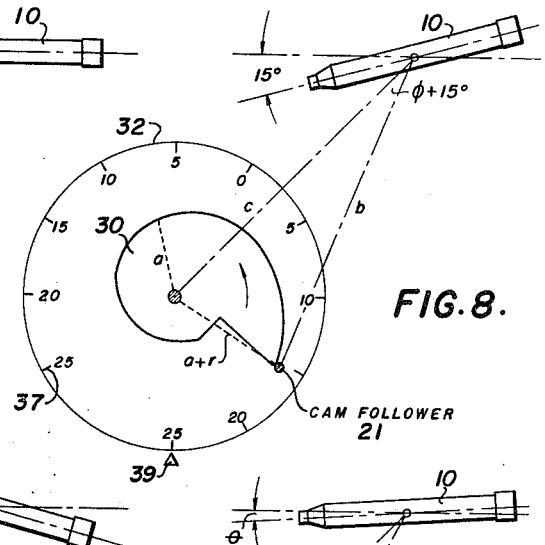
Figure 9:
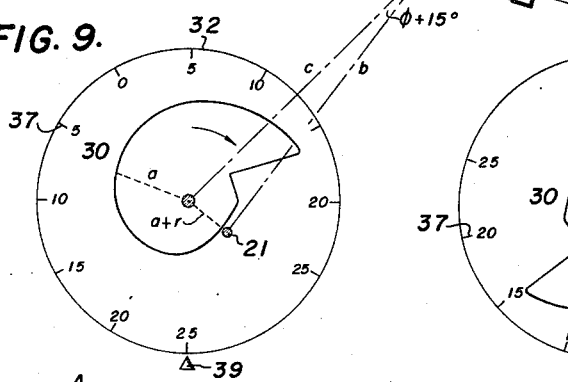

Figs. 7, 8 and 9 disclose the relationship of the elements when the telescope is level, when it is tilted up an arbitrary 15° and when tilted down an arbitrary 15°, respectively. The values $cba$ and $\phi$ are arbitrarily chosen and fixed values. As illustrated, $c$=the fixed distance from the pivot axis of the telescope barrel 10 to the pivot axis of the cam 30,
$b$=the fixed length from the pivot axis of the telescope barrel 10 to a point in contact with the cam 30,
$a$=the radius of the cam from its axis to a point on the cam periphery which is in contact with the follower when the telescope barrel 10 is level or horizontal,
$\phi$=the angle formed by the sides $c$ and $b$ of the $\triangle cab$,
$\theta$=the angle of tilt of the telescope barrel 10,
$w$=the angle between any given radius of the cam and the reference radius $a$,
$M$=the magnification constant of the instrument, and
$r$=the variable increase or decrease in the radius of the cam relative to $a$.

The angles $w$ and $\theta$, and the quantity $r$, can be either plus or minus.

$R=a+r$=the variable radii of the cam.

Figure 10:
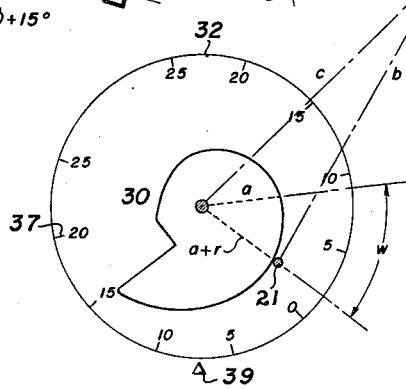

Fig. 10 illustrates the general case where the telescope has been elevated by some angle $\theta$ by the rotation of the cam through some angle $w$, as shown on the dial indicator 32, which is attached to the cam shaft. The design of the cam is such that the angular displacement of the cam varies linearly with the function $M\frac{1}{2} \sin 2\theta$, which when multiplied by the stadia rod intercept $\overline{ef}$ gives the equation for the elevations (Equation 3). Scale 37 on dial 32 is linear and reads directly $M\frac{1}{2} \sin 2\theta$. This gives the key equation (5) $\qquad Kw = M\tfrac{1}{2} \sin 2\theta$ where K is a constant of proportionality determined by the size of the scale 37 desired. From Equation 5

$$\theta = \tfrac{1}{2} \sin^{-1}\left(\frac{2Kw}{M}\right)$$

Also, from the law of cosines, we see from Fig. 10 that (6) $\qquad R^2 = (r+a)^2 = b^2 + c^2 - 2cb \cos(\theta + \phi)$ By substituting the above value of $\theta$ [Equation 5] in Equation 6, we get (7)

$R = r + a = \sqrt{b^2 + c^2 - 2cb \cos[\tfrac{1}{2} \sin^{-1}(2Kw/M) + \phi]}$

This equation gives R in terms of $w$ and hence is the polar equation of the cam. Selecting an arbitrary value of $K=\frac{1}{6}$ and letting the maximum value of $\theta$ be 15° and solving for $w$ from Equation 4, we get $$w = \frac{M\tfrac{1}{2} \sin 2\theta}{K} = 6 \times 100 \times \tfrac{1}{2} \sin 2 \times 15° = 150°$$

Hence 150° on the linear scale 37 or on the cam corresponds to 15° elevation of the telescope. The 150° on the dial scale is graduated linearly from 0, 1, 2, ... 25 which graduations or steps correspond to the angles for which $M\frac{1}{2} \sin 2\theta$ is a simple multiple. The gears 31 and 35 are so linked that one revolution of the micrometer dial 36 turns the main scale 37 one step. The micrometer is graduated linearly from 0 to 100. Thus the device can be read to an accuracy exceeding $\frac{1}{100}$ of a step which far exceeds the accuracy with which present instruments can be aligned. It is not necessary to use only those angles of $\theta$ for which $M\frac{1}{2} \sin 2\theta$ is a multiple since the telescope can be set to any desired angle $\theta$ and the value of $m\frac{1}{2} \sin 2\theta$ can be read directly from the main scale and micrometer. The reading of the main scale 37 when multiplied by the distance between the stadia wires, gives the vertical distance.

As noted supra, the function $M \cos^2 \theta$ is also plotted on the dial 32. This scale 38 is non-linear and when multiplied by the distance between the stadia wires gives the horizontal distance.

It is to be noted that in designing the cam a point contact between the cam follower and the cam was assumed. In practice, as illustrated, a roller member 21 is provided to minimize wear of the cam surface. Use of the roller introduces a minor change in the calculations that is of negligible proportions. While the cam design is directed to provide a linear scale for the elevation readings, it is possible, similarly, to design a cam for the horizontal distance readings whereby these readings may be obtained from a linear scale. In this instance the rotation of the cam will vary linearly with the function $M \cos^2 \theta$ instead of $M\frac{1}{2} \sin 2\theta$ as described herein. However, since in surveying work greater accuracy is desired in elevation readings, the instrument described herein employs a cam to provide linear readings only for measuring elevations.

Having fully described the objects, structure and operation of this invention, we claim:

1. A surveying instrument for determining horizontal distances from and elevations of objects upon which a sighted stadia rod is positioned comprising a horizontally rotatable support, a telescope barrel pivotally tiltable on said support, a cam follower including a roller member secured to said barrel and movable therewith, a first horizontally extending rotatable shaft mounted on said support, a cam secured to said shaft engagedly contacting said roller, biasing means extending between said support and said cam follower adapted to urge said roller against the outer periphery of said cam, a dial indicator secured to said first shaft having a linear scale thereon adapted to indicate said elevations and having a non-linear scale thereon adapted to indicate said horizontal distances when each of said scale indications is multiplied by a stadia rod intercept, a worm wheel arranged on said first shaft for rotation therewith, a pivotal second shaft mounted on said support having a worm and a micrometer dial adapted to provide readings in hundredths of the readings on said linear scale arranged thereon, said worm releasably engaging with said worm wheel, and said cam having radii conforming to the equation:

$$R = r + a = \sqrt{b^2 + c^2 - 2cb \cos\left[\frac{1}{2}\sin^{-1}\left(\frac{2Kw}{M}\right) + \phi\right]}$$

wherein $R$=the radius of the cam at any angle $w$, $c$=the fixed distance from the pivot axis of the telescope barrel to the pivot axis of the cam, $b$=the fixed length from the pivot axis of the telescope barrel to a point in contact with the cam, $a$=radius of the cam from its axis to a point on the cam periphery which is in contact with the follower $b$ when the telescope barrel is horizontal, $r$=the variable increase or decrease in the radius of the cam relative to $a$, $\phi$=the angle formed between the sides $c$ and $b$ of $\Delta cab$, $w$=the angle between any given radius of the cam and the reference radius $a$, $M$=the magnification constant of the telescope.

2. A surveying instrument for determining horizontal distances from and elevations of objects upon which a sighted stadia rod is positioned comprising a horizontally rotatable support, a telescope barrel pivotally tiltable on said support, a cam follower including a roller member secured to said barrel and movable therewith, a first horizontally extending rotatable shaft mounted on said support, a cam secured to said shaft engagedly contacting said roller, biasing means extending between said support and said cam follower adapted to urge said roller against the outer periphery of said cam, a dial indicator secured to said first shaft having a linear scale thereon adapted to indicate elevations and having a non-linear scale thereon adapted to indicate horizontal distances when each of said indications is multiplied by a stadia rod intercept, a worm wheel arranged on said first shaft for rotation therewith, and a pivotal second shaft mounted on said support having a worm, and a micrometer dial adapted to provide readings in hundredths of the readings on said linear scale arranged thereon, said worm releasably engaging with said worm wheel.

3. A surveying instrument for determining horizontal distances from and elevations of objects upon which a sighted stadia rod is positioned comprising a horizontally rotatable support, a telescope barrel pivotally tiltable on said support, a cam follower secured to said barrel, a horizontally extending rotatable shaft mounted on said support, a cam secured to said shaft and configured such that the angular displacement of said cam varies linearly with the function $M\frac{1}{2} \sin 2\theta$ wherein $M$=magnification constant of the instrument and $\theta$=the angle of tilt of the telescope, biasing means extending between said cam follower and said support adapted to urge said cam follower in contact with said cam, a dial indicator secured to said shaft having a linear scale thereon adapted to indicate elevations and a non-linear scale thereon adapted to indicate horizontal distances when each of the scale indications is multiplied by a stadia rod intercept, and means mounted on said support releasably engaging with said shaft adapted to rotate said shaft when engaged therewith.

4. A surveying instrument for determining horizontal distances from and elevations of objects upon which a sighted stadia rod is positioned comprising a horizontally rotatable support, a telescope barrel pivotally tiltable on said support, a cam follower secured to said barrel, a first horizontally extending rotatable shaft mounted on said support, a cam secured to said shaft, biasing means extending between said cam follower and said support adapted to urge said cam follower in contact with said cam, a dial indicator secured to said shaft having a linear scale thereon adapted to provide elevations when said scale reading is multiplied by a stadia rod intercept length and means mounted on said support releasably engaging with said shaft adapted to rotate said shaft when engaged therewith, the angular displacement of said cam varying linearly with the function $M\frac{1}{2} \sin 2\theta$ wherein $M$=the magnification constant of the instrument and $\theta$=the angle of tilt of the telescope.

References Cited in the file of this patent

UNITED STATES PATENTS

| | | |
|---|---|---|
| 1,718,071 | Petschenig | June 18, 1929 |
| 1,779,145 | Proctor | Oct. 21, 1930 |